(12) United States Patent
Barghlame et al.

(10) Patent No.: US 9,777,212 B2
(45) Date of Patent: Oct. 3, 2017

(54) LIGHT EMITTING CONCRETE COMPOSITION AND METHOD OF SYNTHESIZING LIGHT EMITTING CONCRETE STRUCTURE

(71) Applicants: Hadi Barghlame, Tabriz (IR); Hojjat Hashempour Gavgani, Tabriz (IR)

(72) Inventors: Hadi Barghlame, Tabriz (IR); Hojjat Hashempour Gavgani, Tabriz (IR)

(*) Notice: Subject to any disclaimer, the term of this patent is extended or adjusted under 35 U.S.C. 154(b) by 0 days.

(21) Appl. No.: 15/295,564

(22) Filed: Oct. 17, 2016

(65) Prior Publication Data
US 2017/0029696 A1    Feb. 2, 2017

(51) Int. Cl.
| | | |
|---|---|---|
| *C09K 11/02* | (2006.01) | |
| *C09K 11/67* | (2006.01) | |
| *C09K 11/57* | (2006.01) | |
| *C09K 11/56* | (2006.01) | |
| *C04B 26/18* | (2006.01) | |
| *C04B 26/14* | (2006.01) | |
| *C04B 26/06* | (2006.01) | |
| *C04B 28/02* | (2006.01) | |
| *C04B 111/80* | (2006.01) | |
| *C04B 103/54* | (2006.01) | |

(52) U.S. Cl.
CPC ............. *C09K 11/02* (2013.01); *C04B 26/06* (2013.01); *C04B 26/14* (2013.01); *C04B 26/18* (2013.01); *C04B 28/02* (2013.01); *C09K 11/565* (2013.01); *C09K 11/567* (2013.01); *C09K 11/572* (2013.01); *C09K 11/67* (2013.01); *C04B 2103/54* (2013.01); *C04B 2111/807* (2013.01)

(58) Field of Classification Search
CPC ..... C04B 14/06; C04B 14/36; C04B 2102/54; C04B 2111/807
See application file for complete search history.

(56) References Cited

U.S. PATENT DOCUMENTS

| | | | | |
|---|---|---|---|---|
| 6,833,434 B2* | 12/2004 | Kang | ........................ | C08J 11/06 521/164 |
| 2004/0011256 A1* | 1/2004 | Beimel | ............... | C04B 20/1033 106/712 |
| 2006/0162620 A1* | 7/2006 | Horton | ................ | C04B 20/1037 106/712 |

* cited by examiner

*Primary Examiner* — Carol M Koslow
(74) *Attorney, Agent, or Firm* — Barry Choobin; Patent 360

(57) ABSTRACT

The various embodiments herein provide a light emitting concrete composition and a method of synthesizing a light emitting concrete structure. The light emitting concrete composition comprises light-emitting pigments. The light emitting pigments include a titanium powder, a sulphide powder and resins, cement, sand, gravel and water. The method of synthesizing a light emitting concrete structure comprises preparing slurry. The slurry is prepared by mixing sand, gravel, cement and water. Further, a light emitting pigment mixture is prepared. The light emitting pigment mixture is prepared by mixing a titanium powder, resins and a sulphide powder. The light-emitting pigment mixture is added to the slurry. The slurry is molded by adding the slurry in molds. The molds are further kept at a temperature of 15-20° C. for at least 12-14 hours. The slurry is cured at a temperature of less than 30° C. for 24 hours.

16 Claims, 1 Drawing Sheet

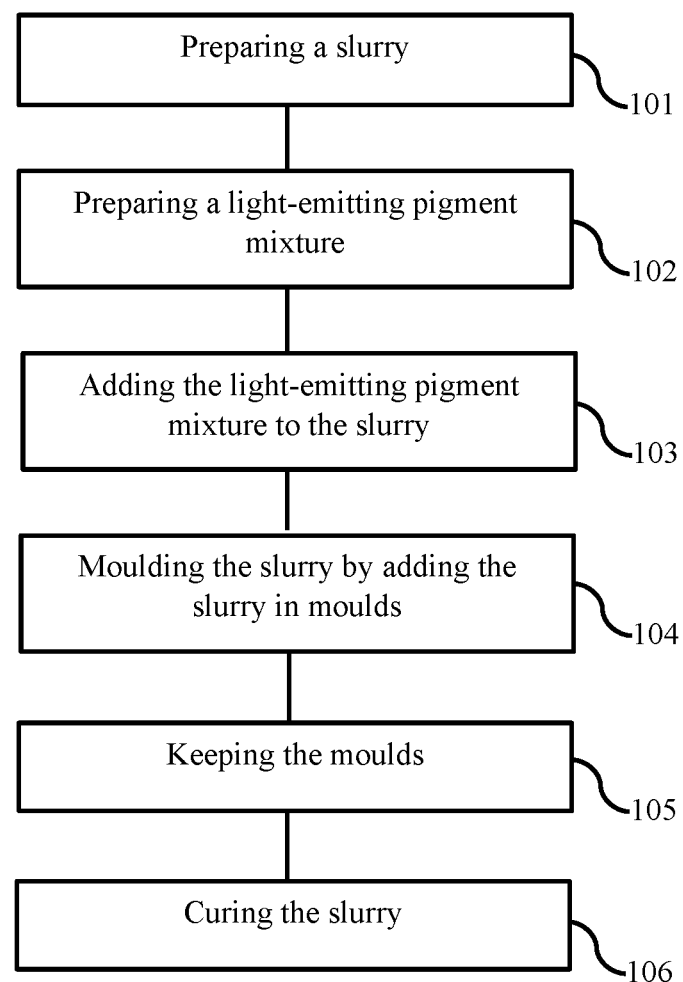

LIGHT EMITTING CONCRETE COMPOSITION AND METHOD OF SYNTHESIZING LIGHT EMITTING CONCRETE STRUCTURE

BACKGROUND

Technical Field of Invention

The embodiments herein generally relate to light emitting materials and particularly to light emitting concrete. Present invention deals with developing a light emitting or luminescent concrete store system, which can absorb ambient light and emit the stored light with different colors when the ambient light source is completely removed.

DESCRIPTION OF THE RELATED ART

The light-emitting pigments, also known as "glow in the dark" pigments, are the pigments that are admixed or dispersed in glass or plastic, in order to give light. The light-emitting pigments are of different colors. The light-emitting pigments are introduced into or applied to small pieces of glass, also called frit or "grit", or to plastic particles, called granulates or masterbatches. The light-emitting pigments are either applied in the form of a coating, varnish, paint, or an adhesive layer, or introduced or applied by heating. These light-emitting pigments give glow to the product on which they are applied giving way to various applications such as lighting streets, enlightening an ambience of a place, using as decorative items, etc. But the resistance of these paints against environmental threats such as humidity, extreme heat and cold, erosion and attrition is low. Hence it is difficult to produce light emitting substances that can sustain the various environmental threats.

The application of optical glass fibers was successfully developed in year 2003 in which a translucent concrete was developed. The internal concrete had highly alkaline environment that made the light glass fiber in such an environment highly prone to erosion. Also these light emitting materials lack the self-light emitting properties.

Hence there is a need to develop light emitting products that are self-light emitters, are easy to produce and are environmental friendly. There is a need to develop self-light emitting products that are able to absorb ambient light and in return emit the same amount of light sufficient enough to light a place even after removing the ambient light source The above mentioned shortcomings, disadvantages and problems are addressed herein, as detailed below.

SUMMARY OF THE INVENTION

Thus, the primary object of the embodiments herein is to provide a light emitting concrete composition that is an admixture that is capable of emitting light even after the source of light is removed.

Another object of the embodiments herein is to provide a light emitting concrete structures having more light emitting power sufficient enough to enlighten a place.

Yet another object of the embodiments herein is to provide a light emitting concrete composition that uses titanium and sulphide powders to increase the light emitting power of a concrete structure.

Yet another object of the embodiments herein is to provide light emitting concrete structures that are environment friendly, cheap, emit ample of light by absorbing ambient light after removing the ambient light source.

Yet another object of the embodiments herein is to provide a light emitting concrete structure in various forms such as in the form of an artificial stone, that absorbs ambient light and emits light in different colors after removing the ambient light.

Yet another object of the embodiments herein is to provide light emitting concrete structures that can emit lights of various colors.

Yet another object of the present invention is to provide a method of making a light emitting concrete structure in various forms for various applications.

The various embodiments herein provide a light emitting concrete composition and a method of synthesizing a light emitting concrete structure. According to an embodiment herein, the light emitting concrete composition comprises light-emitting pigments mixture. The light emitting pigments mixture includes a metallic powder, a sulphide powder and resins, cement, sand, gravel and water. The metallic powder is titanium powder. The sulphide powder is selected from the group consisting of calcium sulphide, zinc sulphide, manganese sulphide or strontium sulphide. Just one of the resins is selected from among the group consisting of furan, furan epoxide, polyester, maleic polyester, acrylate polyester, epoxide, phenol formaldehyde, acetone formaldehyde, carbamide, acrylic resin, vinyl monomers, acrylate and methacrylate based binders, vinyl esters, monomers of vinyl series, polyurethane, epoxy resins, epoxy-polyaniline combination, furan epoxy combination (FAED) or combination thereof. The metallic powder is present in an amount of 3% of a total amount of the cement. The sulphide powder is present in an amount of 3% of a total amount of the cement. The resin is added in an amount of 6-7% of a total weight of the cement.

According to another embodiment herein, a method of synthesizing a light emitting concrete structure comprises preparing slurry. The slurry is prepared by mixing sand, gravel, cement and water. Further, a light-emitting pigment mixture is prepared. The light emitting pigment mixture is prepared by mixing a metallic powder, resins and a sulphide powder. The light-emitting pigment mixture is added to the slurry. The slurry is moulded by adding the slurry in moulds. The moulds are further kept at a temperature of 15-20° C. for at least 12 hours. The slurry is cured at a temperature of less than 30° C. for 24 hours. The metallic powder is titanium powder. The sulphide powder is selected from the group consisting of calcium sulphide, zinc sulphide, manganese sulphide and strontium sulphide. Just one of the resins is selected from among the group consisting of furan, furan epoxide, polyester, maleic polyester, acrylate polyester, epoxide, phenol formaldehyde, acetone formaldehyde, carbamide, acrylic resin, vinyl monomers, acrylate and methacrylate based binders, vinyl esters, monomers of vinyl series, polyurethane, epoxy RESINS, epoxy-polyaniline combination, furan epoxy combination (FAED) or combination thereof The resin is added in an amount of 6-7% of a total weight of the cement added. The metallic powder is added in an amount of 3% of a total amount of the cement added. The sulphur powder is added in an amount of 3% of a total amount of cement added.

According to an embodiment herein, the method further comprises applying a covering layer on the concrete structure, wherein the covering layer is prepared by mixing a sulphide powder, a paint thinner a paint and a sealer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIGURE is a flow chart showing the various steps involved in the method of synthesizing a light emitting concrete structure, according to an embodiment herein.

DETAILED DESCRIPTION OF THE DRAWINGS

In the following detailed description, a reference is made to the accompanying drawings that form a part hereof, and in which the specific embodiments that maybe practiced is shown by way of illustration. The embodiments are described insufficient detail to enable those skilled in the art to practice the embodiments and it is to be understood that the logical, mechanical and other changes may be made without departing from the scope of the embodiments. The following detailed description is therefore not to be taken in a limiting sense.

According to the various embodiments herein, light emitting concrete refers to concrete or artificial stone that absorbs the ambient light and emit lights with different colors after removing the source of light. The embodiments herein provide method of making light emitting concrete that is capable of absorbing, storing and emitting light.

The embodiments herein provide a light emitting concrete composition and a method of producing concrete in various forms that absorbs ambient light and emits light in different colors after removing ambient light.

According to the embodiments herein, the use of titanium and sulphide powders increases the absorption of light and the light emitting power of the concrete is increased substantially. According to an embodiment herein, the present invention provides a light emitting concrete. The light emitting concrete absorbs and stores ambient light and emits light by itself even after removing the ambient light. In accordance with an embodiment herein, titanium and sulphide powders are mixed with the one of mentioned resins and the concrete.

FIGURE is a flow chart showing the various steps involved in the method of synthesizing a light emitting concrete structure, according to an embodiment herein. With respect to FIGURE, the method of synthesizing a light emitting concrete structure comprises preparing a slurry (101). The slurry is prepared by mixing sand, gravel, cement and water. The light-emitting substances mixture is prepared (102). The light emitting substances mixture is prepared by mixing metallic powder, and a sulphide powder. The light-emitting substances admixture is added to the slurry (103). The slurry is moulded by adding the slurry in moulds (104). The moulds are further kept at a temperature of 15-20° C. for at least 12-15 hours without being exposed to air (105). The slurry is cured at a temperature of less than 30° C. for 24 hours (106). The metallic powder is titanium powder. The sulphide powder is selected from the group consisting of calcium sulphide, zinc sulphide, manganese sulphide and strontium. Just one of the resins is selected from among the group consisting of furan, furan epoxide, polyester, maleic polyester, acrylate polyester, epoxide, phenol formaldehyde, acetone formaldehyde, carbamide, acrylic resin, vinyl monomers, acrylate and methacrylate based binders, vinyl esters, monomers of vinyl series, polyurethane, epoxy resins, epoxy-polyaniline combination, furan epoxy combination (FAED) or combination thereof The resin is added in an amount of 6-7% of a total weight of the cement. The metallic powder (titanium is added in an amount of 3% of a total amount of the cement. The sulphide powder is added in an amount of 3% of a total amount of cement added.

According to an embodiment herein, the method further comprises applying a covering layer on the concrete structure, wherein the covering layer is prepared by mixing a sulphide powder, a paint thinner, a paint and a sealer.

According to the embodiments herein, different sulphide powders emit different colors of lights. For example, according to an embodiment herein, green light is emitted by the use of calcium sulphide powder, while yellow color is emitted by the use of zinc sulphide powder, while red color is emitted by the use of manganese sulphide powder and blue color is emitted by the use of strontium sulphide powder.

Thus in the present invention by adding another material to calcium sulphide or other similar material to sulphide powder, the absorption of light emission power is improved and therefore it is applicable for mass materials such as concrete, artificial stones, etc. In addition, absorption of light is not blocked in the concrete member so it is emitted. Furthermore, these materials are not considered as a covering but as an admixture that is added while mixing the concrete materials.

Example 1

In order to produce light emitting concrete that emits cyan light after removing the ambient light, the titanium and calcium sulphide powders were mixed with epoxy resin, polyester resin or other resins. The resins was mixed in quantity of 5 to 7% of the total weight of cement added in the concrete and the titanium and calcium sulphide powders were mixed in a quantity of 3% of the each of the total weight of the cement used in the concrete. The concrete was then mixed finely. The role of the resins is that the resins help in color stabilization and admixture of the powders or light emitting pigments in water. The light emitting concrete produced in this way is kept protected or covered at a temperature of 15° C. to 25° C. for 12 hours without exposure to air.

Example 2

In order to produce light emitting concrete that emits yellow light after removing the ambient light, titanium and zinc sulphide powders were mixed with epoxy resin, polyester resin or other mentioned resins in the same quantities as mentioned in example 1. The concrete was then mixed finely. The light emitting concrete produced in this way was kept protected or covered at a temperature of 15° C. to 25° C. for 12 hours without exposure to air.

Example 3

In order to produce light emitting concrete that emits green light after removing the ambient light, titanium and manganese sulphide powders were mixed with epoxy resin, polyester resin or other mentioned resins in the same quantities as mentioned in example 1. The concrete was then mixed finely. The light emitting concrete produced in this way was kept protected or covered at a temperature of 15° C. to 25° C. for 12 hours without exposure to air.

Example 4

In order to produce light emitting concrete that emits blue light after removing the ambient light, titanium and strontium sulphide powders were mixed with epoxy resin, polyester resin or other mentioned resins in the same quantities as mentioned in example 1. The concrete was then mixed finely. The light emitting concrete produced in this way was kept protected or covered at a temperature of 15° C. to 25° C. for 12 hours without exposure to air.

Table 1 below summarises the different kinds of colors that is produced by using various powders, according to the embodiments herein.

TABLE 1

Different Lights Emitted from Metal Sulphides

| | | | |
|---|---|---|---|
| Example 1 | Calcium Sulphide | CaS | Green Light |
| Example 2 | Zinc Sulphide | ZnS | Yellow Light |
| Example 3 | Manganese Sulphide | MnS | Red Light |
| Example 4 | Strontium Sulphide | SrS | Blue Light |

By increasing the amount of sulphide and titanium powders, the light absorption and light emission power are improved respectively in the concrete. The light emitting concrete is the concrete or artificial stone that absorbs ambient light and emits light by itself even after removing the ambient light. For making this type of concrete, the titanium powder and sulphide powders, according to the embodiments herein, are mixed with one of mentioned resins. After that, the mixture is added to concrete while all materials of concrete are mixed together.

According to an embodiment herein, special covers are prepared. These special covers emit light. The method of preparing the special cover comprises mixing a sulphide powder, a paint thinner and a paint and a sealer. The special cover is applied to the concrete structures in the form of surface layers. The thicker the layers the more the light it emits. The sulphide powder is added in a quantity of 200-250 grams for 1 kg of paint. The paint thinner is added in a quantity to sufficiently dilute the paint so that it can be applied easily.

According to the embodiments herein, the present invention is used in structural and non-structural concrete members where the ambient light is low or even absent. The present invention provides a useful and frugal method of providing light. The concrete structures are used in places where the lighting is expensive, such as to light the road signs, curbs and concrete pavements to facilitate smooth traffic at night. Also, the light emitting concrete of the present invention is used in parks as artificial stones in building facades in order to create a better view at nights. The light emitting materials used in the embodiments herein have no cement hydration reactions and have no impact on the properties of the concrete.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A light emitting concrete composition comprises:
   light-emitting pigment mixture, wherein the light emitting pigment mixture includes a metallic powder, a sulphide powder and a plurality of resins;
   cement;
   sand;
   gravel; and
   water.

2. The concrete composition according to claim 1, wherein the metallic powder is Titanium powder.

3. The concrete composition according to claim 1, wherein the sulphide powder is selected from the group consisting of calcium sulphide, zinc sulphide, manganese sulphide or strontium sulphide.

4. The concrete composition according to claim 1, wherein the plurality of resin is one or more selected from the group consisting of furan, furan epoxide, polyester, maleicpolyester, acrylate polyester, epoxide, phenol formaldehyde, acetone formaldehyde, carbamide, acrylic resin, vinyl monomers, acrylate and methacrylate based binders, vinyl esters, monomers of vinyl series, polyurethane, epoxy resins, epoxy-polyaniline combination, furan-epoxy combination (FAED) or combination thereof.

5. The concrete composition according to claim 1, wherein the metallic powder is present in an amount of 3% of a total amount of the cement.

6. The concrete composition according to claim 1, wherein the sulphide powder is present in an amount of 3% of a total amount of the cement.

7. The concrete composition according to claim 1, wherein the resin is added in an amount of 6-7% of a total weight of the cement.

8. A method of synthesizing a light emitting concrete structure, comprises:
   preparing a slurry, wherein the slurry is prepared by mixing sand, gravel, cement and water;
   preparing a light-emitting pigment mixture, wherein the light emitting pigment mixture is prepared by mixing a metallic powder, a plurality of resins and a sulphide powder;
   adding the light-emitting pigment mixture to the slurry;
   moulding the slurry by adding the slurry in moulds;
   keeping the moulds at a temperature of 15-20° C. for at least 12 hours; and curing the slurry at a temperature of less than 30° C. for 24 hours.

9. The method according to claim 8, wherein the metallic powder is titanium powder.

10. The method according to claim 8, wherein the sulphide powder is selected from the group consisting of calcium sulphide, zinc sulphide, manganese sulphide and strontium sulphide.

11. The method according to claim 8, wherein the plurality of resins are one or more selected from the group consisting of furan, furan epoxide, polyester, maleic polyester, acrylate polyester, epoxide, phenol formaldehyde, acetone formaldehyde, carbamide, acrylic resin, vinyl monomers, acrylate and methacrylate based binders, vinyl esters, monomers of vinyl series, polyurethane, epoxy resins, epoxy-polyaniline combination, furan-epoxy combination (FAED) or combination thereof.

12. The method according to claim 8, wherein the resin is added in an amount of 6-7% of a total weight of the cement added.

13. The method according to claim 8, wherein the metallic powder is added in an amount of 3% of a total amount of the cement added.

14. The method according to claim 8, wherein the sulphide powder is added in an amount of 3% of a total amount of cement added.

15. The method according to claim 8, wherein the method further comprises applying a covering layer on the concrete structure, wherein the covering layer is prepared by mixing a sulphide powder, a paint thinner, a paint and a sealer.

16. The method according to claim 15, wherein the sulphide powder is added in an amount of 200-250 g per each kilogram of paint.

* * * * *